US009783281B2

(12) United States Patent
Cook et al.

(10) Patent No.: US 9,783,281 B2
(45) Date of Patent: Oct. 10, 2017

(54) AIRCRAFT INTERIOR LAVATORY

(71) Applicant: B/E Aerospace, Inc., Wellington, FL (US)

(72) Inventors: Donald F. Cook, Arlington, WA (US);
Liberty Harrington, Seattle, WA (US);
Philipp Steiner, Seattle, WA (US);
Robert K. Brauer, Seattle, WA (US);
Trevor Skelly, Mercer Island, WA (US)

(73) Assignee: B/E AEROSPACE, INC., Wellington, FL (US)

( * ) Notice: Subject to any disclaimer, the term of this patent is extended or adjusted under 35 U.S.C. 154(b) by 0 days.

(21) Appl. No.: 15/234,374

(22) Filed: Aug. 11, 2016

(65) Prior Publication Data
US 2017/0036749 A1 Feb. 9, 2017

Related U.S. Application Data

(63) Continuation of application No. 15/141,338, filed on Apr. 28, 2016, now Pat. No. 9,440,742, which is a continuation of application No. 14/709,409, filed on May 11, 2015, now Pat. No. 9,434,476, which is a continuation of application No. 14/043,500, filed on Oct. 1, 2013, now Pat. No. 9,073,641, which is a continuation of application No. 13/089,063, filed on Apr. 18, 2011, now Pat. No. 8,590,838.
(Continued)

(51) Int. Cl.
B64D 11/06 (2006.01)
B64C 1/10 (2006.01)
B64D 11/02 (2006.01)
B64F 5/00 (2017.01)

(52) U.S. Cl.
CPC ............... B64C 1/10 (2013.01); B64D 11/02 (2013.01); B64D 11/06 (2013.01); B64F 5/00 (2013.01); Y02T 50/46 (2013.01)

(58) Field of Classification Search
CPC ............ B64D 11/00; B64D 2011/0046; B64D 11/0023; B64D 11/06; B64D 2011/0617; B64D 2011/0665; B63B 11/00; B63B 11/02; B63B 29/00; B63B 29/02
See application file for complete search history.

(56) References Cited

U.S. PATENT DOCUMENTS 2,650,368 A 9/1953 Evans
2,760,443 A 8/1956 Gobrecht
(Continued)

FOREIGN PATENT DOCUMENTS

DE 694 22 723 6/2000
DE 697 25 542 4/2004
(Continued)

OTHER PUBLICATIONS

Slide Deck, B/E Aerospace, Spacewall Technology, Examiner Interview, Feb. 24, 2016, 53 pages.
(Continued)

Primary Examiner — Benjamin P Lee
(74) Attorney, Agent, or Firm — Gardella Grace P.A.

(57) ABSTRACT

In a preferred embodiment, a lavatory for an aircraft cabin includes a wall having a forward wall portion disposed immediately aft of and substantially conforming to an exterior aft surface of an aircraft passenger seat, that is substantially not flat in a vertical plane.

19 Claims, 1 Drawing Sheet

Related U.S. Application Data

(60) Provisional application No. 61/346,835, filed on May 20, 2010, provisional application No. 61/326,198, filed on Apr. 20, 2010.

(56) References Cited

U.S. PATENT DOCUMENTS

| | | |
|---|---|---|
| 2,914,001 A | 11/1959 | Murphy |
| 3,738,497 A | 6/1973 | Betts et al. |
| 4,055,317 A | 10/1977 | Greiss |
| 4,884,767 A | 12/1989 | Shibata |
| 5,150,863 A | 9/1992 | Hozumi et al. |
| 5,333,416 A | 8/1994 | Harris et al. |
| 5,340,059 A | 8/1994 | Kanigowski |
| 5,482,230 A | 1/1996 | Bird et al. |
| 5,529,265 A | 6/1996 | Sakurai |
| 5,577,358 A | 11/1996 | Franke |
| 5,611,503 A | 3/1997 | Brauer |
| 5,716,026 A | 2/1998 | Pascasio et al. |
| 6,000,659 A | 12/1999 | Brauer |
| 6,079,669 A | 6/2000 | Hanay et al. |
| 6,237,872 B1 | 5/2001 | Bar-Levav |
| 6,520,451 B1 | 2/2003 | Moore |
| 6,615,421 B2 | 9/2003 | Itakura |
| 6,742,840 B2 | 6/2004 | Bentley |
| 6,822,812 B1 | 11/2004 | Brauer |
| 6,874,731 B1 | 4/2005 | Brauer et al. |
| 6,889,936 B1 | 5/2005 | Pho et al. |
| D508,173 S | 8/2005 | Guard et al. |
| D516,496 S | 3/2006 | Guard et al. |
| D533,129 S | 12/2006 | Guard et al. |
| 7,156,345 B2 | 1/2007 | Brauer et al. |
| 7,222,820 B2 | 5/2007 | Wentland et al. |
| 7,252,267 B2 | 8/2007 | Young et al. |
| 7,284,287 B2 | 10/2007 | Cooper et al. |
| 7,331,545 B2 | 2/2008 | Young et al. |
| 7,448,574 B2 | 11/2008 | Young et al. |
| 7,448,575 B2 | 11/2008 | Cheung et al. |
| 7,469,860 B2 | 12/2008 | Young et al. |
| 7,516,919 B2 | 4/2009 | Young et al. |
| D606,923 S | 12/2009 | Young et al. |
| D617,254 S | 6/2010 | Guard et al. |
| 7,871,039 B2 | 1/2011 | Fullerton et al. |
| 7,934,679 B2 | 5/2011 | Bock et al. |
| 8,087,613 B2 | 1/2012 | Fullerton et al. |
| 8,096,502 B2 | 1/2012 | Bock et al. |
| 8,109,469 B2 | 2/2012 | Breuer et al. |
| 8,162,258 B2 | 4/2012 | Joannis et al. |
| 8,167,244 B2 | 5/2012 | Johnson et al. |
| 8,177,163 B2 | 5/2012 | Wilcynski et al. |
| 8,590,838 B2 | 11/2013 | Cook et al. |
| D705,909 S | 5/2014 | Koyama et al. |
| 2006/0192050 A1 | 8/2006 | Cheung et al. |
| 2007/0164157 A1 | 7/2007 | Park |
| 2007/0170310 A1 | 7/2007 | Bock et al. |
| 2007/0241232 A1 | 10/2007 | Thompson |
| 2007/0295863 A1 | 12/2007 | Thompson |
| 2009/0050738 A1 | 2/2009 | Breuer et al. |
| 2009/0065642 A1 | 3/2009 | Cheung et al. |
| 2009/0146004 A1 | 6/2009 | Plant |
| 2009/0200422 A1 | 8/2009 | Johnson et al. |
| 2009/0255437 A1 | 10/2009 | Hachet et al. |
| 2010/0059625 A1 | 3/2010 | Saint-Jalmes et al. |
| 2010/0181425 A1 | 7/2010 | Guering et al. |
| 2011/0121134 A1 | 5/2011 | Schotte et al. |
| 2011/0139930 A1 | 6/2011 | Sutthoff et al. |
| 2011/0210205 A1 | 9/2011 | Bock et al. |
| 2012/0112505 A1 | 5/2012 | Breuer et al. |
| 2012/0253752 A1 | 10/2012 | Brauer |
| 2012/0273614 A1 | 11/2012 | Ehlers et al. |
| 2012/0325964 A1 | 12/2012 | Hawkins et al. |
| 2013/0206906 A1 | 8/2013 | Burrows et al. |
| 2014/0014774 A1 | 1/2014 | Pozzi et al. |
| 2014/0027572 A1 | 1/2014 | Ehlers et al. |
| 2014/0027574 A1 | 1/2014 | Obadia et al. |
| 2015/0363656 A1 | 12/2015 | Brauer |

FOREIGN PATENT DOCUMENTS

| | | |
|---|---|---|
| EP | 0 722 404 | 7/1996 |
| EP | 0 850 834 | 7/1998 |
| EP | 1281614 | 3/2005 |
| EP | 1 685 023 | 8/2006 |
| WO | 03026495 | 4/2003 |
| WO | 2005014395 | 2/2005 |
| WO | 2005080196 | 9/2005 |
| WO | 2007006938 | 1/2007 |

OTHER PUBLICATIONS

International Search Report, Sep. 15, 2011, 8 pages.
McDonnel Douglas, DC-10 Customer Configuration, Oct. 1978, 177 pages.
C&D Zodiac, Inc.'s proposal to Scandinavian Airlines System to manufacture S4 Storage Unit, Aug. 23, 2001, 17 pages.
C&D Zodiac, Inc.'s drawings with a leading p. entitled "MD90," 27 pages.
Photographs of C&D Zodiac, Inc.'s S4 storage unit, 5 pages.
C&D Zodiac, Inc.'s Petition for Inter Partes Review of U.S. Pat. No. 8,590,838 (including Exhibits tabs 1-9), May 2, 2014, 856 pages.
Technical Proposal by FSI to Air France regarding a Door 4 overhead crew rest station for the Boeing 747, Aug. 3, 1994, 10 pages.
Rendering and photographs of Boeing 747 overhead crew station, 3 pages.
B/E Aerospace, Inc.'s Motion for Preliminary Injunction, May 16, 2014, 25 pages.
Greg Chamitoff Declaration in support of B/E Aerospace, Inc.'s Motion for Preliminary Injunction, May 14, 2014, 39 pages.
International Search Report, Jan. 27, 2015, 5 pages, from PCT/US2013/050342 published as WO 2014/014780 on Jan. 23, 2014.
Petition for Post Grant Review of Design U.S. Pat. No. D764,031 filed Apr. 10, 2017 and assigned PGR No. PGR2017-00019.
Petition for Inter Partes Review of U.S. Pat. No. 9,365,292 filed Apr. 13, 2017 and assigned IPR No. IPR2017-01274.
Petition for Inter Partes Review of U.S. Pat. No. 9,073,641 filed Apr. 13, 2017 and assigned IPR No. IPR2017-01275.
Petition for Inter Partes Review of U.S. Pat. No. 9,440,742 filed Apr. 13, 2017 and assigned IPR No. IPR2017-01276.
Final Written Decision in IPR2014-00727 under 35 U.S.C. § 318; 37 C.F.R. § 42.73.
Declaration of Alan Anderson Under 37 C.F.R. § 1.68.
Rendering of the KLM Crew Rest.
Declaration of Paul Sobotta executed Apr. 2, 2015 and submitted in IPR2014-00727.
Image of B/E Aerospace "Spacewall," available at <http://beaerospace.com/products/structures-and-integration/737-advanced-lavatory/>.
Unopposed Motion to Withdraw Motion for Preliminary Injunction in *B/E Aerospace, Inc. v. Zodiac Aerospace, et al.*, No. 2:14-cv-210, Dkt. 47 (Ed. Tex. Jun. 6, 2014).
Voluntary Dismissal in B/E Aerospace, Inc. v. Zodiac Aerospace, et al., No. 2:14-cv-210, Dkt. 50 (E.D. Tex. Jun. 19, 2014).
Patent Owner's Opening Brief in Federal Circuit Appeal Nos. 16-1496, 16-1497.
Declaration of Scott Savian, dated Mar. 20, 2017, including Exhibits A-E thereto.
Declaration of Vince Huard, dated Mar. 10, 2017, including Exhibits A-I thereto.
McDonnell Douglas DC-10 Customer Configuration Summary (a/k/a Orange Book), revised Oct. 1978 (the "Orange Book").
Declaration of Ronald Kemnitzer executed Apr. 10, 2017 and submitted in PGR2017-00019.
B/E Aerospace Press Release regarding Investor Day Webcast dated Mar. 12, 2012.
Letters from Petitioner, C&D Zodiac, Inc. to Patent Owner, B/E Aerospace, Inc. regarding Prior Art.
B/E Aerospace Investor Day Presentation dated Mar. 12, 2012.
"New aircraft lav sees B/E Aerospace flushed with success," Apex Editor's Blog Article dated Apr. 19, 2013.

(56) References Cited

OTHER PUBLICATIONS

SEC Exhibit 99.1—B/E Aerospace News Release—"B/E Aerospace Wins Exclusive Boeing Award; Program Estimated Value in Excess of $800 Million."

B/E Aerospace's Complaint for Patent Infringement in *B/E Aerospace, Inc.* v. *Zodiac Aerospace, Inc. et al.*, No. 2:14-cv-01417 (E.D. Tex., Dec. 15, 2016).

Declaration of R. Klaus Brauer, submitted during prosecution of U.S. Appl. No. 14/709,378.

Declaration of Mitchell Freeman, submitted during prosecution of U.S. Appl. No. 14/709,378.

Screen capture from website of Tony Bravetti, available at <http://www.tonybravetti.com/my-work-edited.

B/E Aerospace News Release—"Boeing Delivers First of 100 Next-Generation 737s to Delta Air Lines Configured with Numerous B/E Aerospace Systems and Products."

AIRCRAFT INTERIOR LAVATORY

CROSS-REFERENCES TO RELATED APPLICATIONS

This application is a continuation of and claims the benefit of priority from U.S. Ser. No. 15/141,338 filed Apr. 28, 2016. U.S. Ser. No. 15/141,338 is a continuation of and claims the benefit of priority from U.S. Ser. No. 14/709,409, filed May 11, 2015, which is a continuation of U.S. Ser. No. 14/043,500, filed on Oct. 1, 2013, U.S. Pat. No. 9,073,641, issue date Jul. 7, 2015, which is a continuation of U.S. Ser. No. 13/089,063, filed on Apr. 18, 2011, U.S. Pat. No. 8,590,838, issue date Nov. 26, 2013, which claims priority from Provisional Application No. 61/326,198, filed Apr. 20, 2010, and Provisional Application No. 61/346,835, filed May 20, 2010, which are incorporated by reference in their entirety herein.

BACKGROUND OF THE INVENTION

The present invention relates generally to aircraft enclosures, and more particularly relates to an aircraft cabin enclosure, such as a lavatory, an aircraft closet, or an aircraft galley, for example, including an aircraft cabin structure having an aft portion with a substantially vertically extending exterior aft surface that is substantially not flat in a vertical plane.

Aircraft lavatories, closets and other full height enclosures commonly have forward walls that are flat in a vertical plane. Structures such as passenger seats installed forward of such aircraft lavatories, closets and similar full height enclosures often have shapes that are contoured in the vertical plane. The juxtaposition of these flat walled enclosures and contoured structures renders significant volumes unusable to both the function of the flat walled lavatory or enclosure and the function of the contoured seat or other structure. Additionally, due to the lack of a provision for structural load sharing, conventional aircraft lavatories require a gap between the lavatory enclosures and adjacent structures, resulting in a further inefficiency in the use of space.

Aircraft bulkheads, typically separating passenger cabin areas or classes of passenger service, are in common use, and typically have a contour permitting passengers seated behind the bulkhead to extend their feet modestly under the premium seats immediately forward of the bulkhead. These provide a comfort advantage to passengers seated behind the bulkhead, but provide no increased efficiency in the use of space, in that they do not enable the seats fore and aft of the bulkhead to be placed more closely together. Short, floor-mounted stowage boxes, typically no taller than the bottom cushion of a passenger seat, are often positioned between the flat wall of current lavatories or other enclosures and passenger seats. These provide no improvement to the utility or spatial efficiency of the lavatory or other enclosure. While they do provide some useful stowage for miscellaneous items, they do not provide sufficient additional stowage to provide more space for passenger seating.

It would be desirable to provide an aircraft lavatory or other enclosure that can reduce or eliminate the gaps and volumes of space previously required between lavatory enclosures and adjacent structures to allow an adjacent structure such as passenger seating installed forward of the lavatory or other enclosure to be installed further aft, providing more space forward of the lavatory or enclosure for passenger seating or other features than has been possible in the prior art. Alternatively, the present invention can provide a more spacious lavatory or other enclosure with no need to move adjacent seats or other structures forward.

It would also be desirable to provide an aircraft lavatory or other enclosure with a wall to bear loads from an adjacent passenger seating or other structure, permitting elimination of a required gap between the lavatory or other enclosure and the adjacent passenger seating or other structure, making more space available for other uses. In addition, enabling a lavatory or other enclosure to bear loads from an adjacent structure can reduce the combined weight of the lavatory or other enclosure and the adjacent structure.

It also would be desirable to provide an aircraft lavatory or other enclosure that can reduce or eliminate the gaps and volumes of space previously required between lavatory enclosures and adjacent structures, to allow the installation of an increased number of passenger seats, to increase the value of the aircraft. The present invention meets these and other needs.

SUMMARY OF THE INVENTION

Briefly, and in general terms, the present invention provides for an enclosure, such as a lavatory, an aircraft closet, or an aircraft galley, for example, for a cabin of an aircraft including a structure having an aft portion with a substantially vertically extending exterior aft surface that is substantially not flat in a vertical plane. The enclosure structure permits a combination of the enclosure with the structure in a manner that permits significant saving of space in the aircraft, which in turn permits more seats to be installed, or more space to be offered per seat, increasing the value of the aircraft.

Accordingly, in one presently preferred aspect, the present invention provides for an enclosure unit for a cabin of an aircraft including an aircraft cabin structure having an aft portion with an exterior aft surface that is substantially not flat in a vertical plane. The enclosure unit can be a lavatory, an aircraft closet, or an aircraft galley, for example. In one presently preferred aspect, the enclosure unit includes one or more walls that are taller than an adjacent aircraft cabin structure, the one or more walls defining an interior enclosure space and having a forward wall portion. The forward wall portion is configured to be disposed immediately aft of and adjacent to or abutting the exterior aft surface of the aircraft cabin structure, and the forward wall portion is shaped to substantially conform to the shape of the exterior aft surface of the aircraft cabin structure.

In another presently preferred aspect, the enclosure unit includes an enclosure stall unit, and the aircraft cabin structure is a passenger seat installed immediately forward of the enclosure stall unit. In another presently preferred aspect, the forward wall portion of the enclosure unit is configured to accept loads from the aircraft passenger seat. In another presently preferred aspect, the forward wall portion includes a forward projection configured to project over an aft portion of the adjacent passenger seat immediately forward of the enclosure stall unit.

In another presently preferred aspect, the enclosure is a lavatory, including a lavatory stall unit with one or more walls having a forward wall portion. The one or more walls define an interior lavatory space, and the forward wall portion is configured to be disposed immediately aft of and adjacent to or abutting an aircraft cabin structure having an exterior aft surface having a shape that is substantially not flat in a vertical plane. In a presently preferred aspect, the forward wall portion is shaped to substantially conform to the shape of the exterior aft surface of the aircraft cabin structure.

In another presently preferred aspect, the aircraft cabin structure is a passenger seat installed immediately forward of the lavatory stall unit, and the forward wall portion of the lavatory stall unit is configured to accept loads from the passenger seat. In another presently preferred aspect, the forward wall portion includes a forward projection configured to project over an aft portion of the adjacent passenger seat immediately forward of the lavatory stall unit. In another presently preferred aspect, the forward wall portion defines a secondary space in the interior lavatory space in an area forward of an aft-most portion of the forward wall portion. The secondary space can provide an amenity stowage space inside the lavatory stall unit in the area forward of an aft-most portion of the forward wall portion, and can include design elements providing visual space inside the lavatory in the area forward of an aft-most portion of the forward wall portion.

In another presently preferred aspect, the present invention provides for an assembly of an aircraft enclosure unit and an aircraft cabin structure for an aircraft cabin, the assembly in combination including an aircraft cabin structure having an exterior aft surface having a shape that is substantially not flat in a vertical plane, and an aircraft enclosure unit including at least one wall having a forward wall portion. The one or more walls define an interior enclosure space, the forward wall portion is disposed immediately aft of and adjacent to the aircraft cabin structure, and the forward wall portion is shaped to substantially conform to the shape of the exterior aft surface of the aircraft cabin structure. In another presently preferred aspect, the aircraft cabin structure is a passenger seat installed immediately forward of the aircraft enclosure unit. In another presently preferred aspect, the forward wall portion is configured to accept loads from the aircraft passenger seat. In another presently preferred aspect, the forward wall portion includes a forward projection configured to project over an aft portion of the adjacent passenger seat immediately forward of the aircraft enclosure unit.

In another presently preferred aspect, the aircraft enclosure unit is a lavatory stall, and the one or more walls define an interior lavatory space. In another presently preferred aspect, the forward wall portion defines a secondary space in the interior lavatory space in an area forward of an aft-most portion of the forward wall portion.

In another presently preferred aspect, the present invention provides for an assembly of an aircraft lavatory unit and an aircraft cabin structure for an aircraft cabin, in which the assembly in combination includes an aircraft cabin structure having an exterior aft surface having a shape that is substantially not flat in a vertical plane, and an aircraft lavatory stall unit including one or more walls having a forward wall portion. In another presently preferred aspect, the one or more walls define an interior lavatory space, the forward wall portion is disposed immediately aft of and adjacent to the aircraft cabin structure, and the forward wall portion is shaped to substantially conform to the shape of the exterior aft surface of the aircraft cabin structure. In another presently preferred aspect, the aircraft cabin structure is a passenger seat installed immediately forward of the aircraft lavatory stall unit, and wherein the forward wall portion of the aircraft lavatory stall unit is configured to accept loads from the passenger seat. In another presently preferred aspect, the forward wall portion includes a forward projection configured to project over an aft portion of the adjacent passenger seat immediately forward of the aircraft lavatory stall unit. In another presently preferred aspect, the forward wall portion defines a secondary space in the interior lavatory space in an area forward of an aft-most portion of the forward wall portion.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
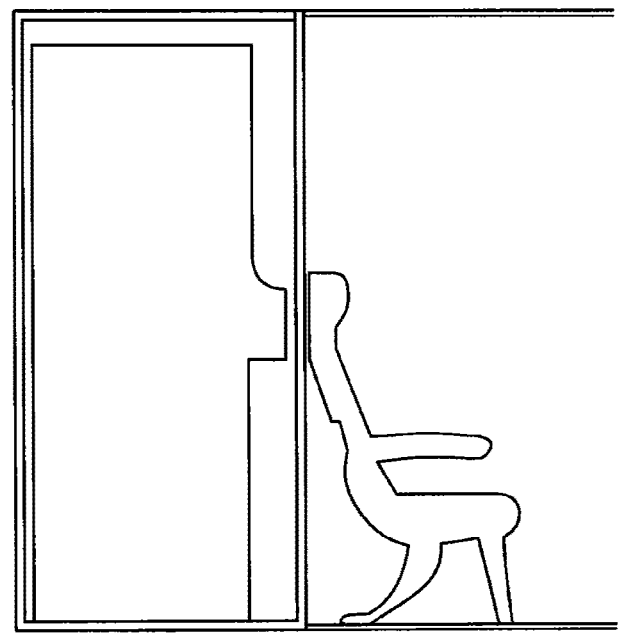
FIG. 1 is a schematic diagram of a prior art installation of a lavatory immediately aft of and adjacent to an aircraft passenger seat.
Figure 2:
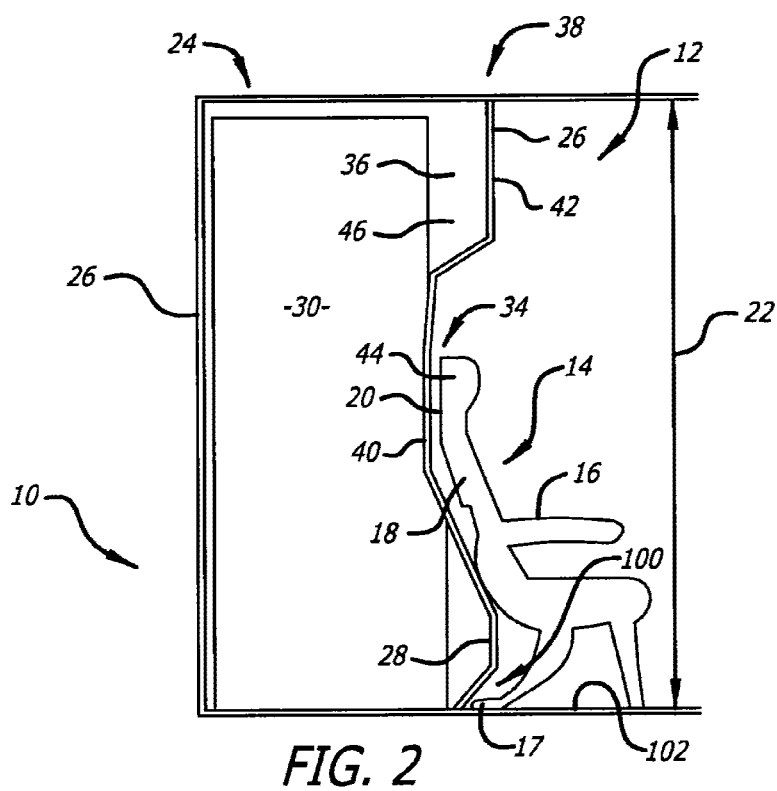
FIG. 2 is a schematic diagram of an installation of a lavatory according to the present invention immediately aft of and adjacent to or abutting an aircraft cabin passenger seat.

Referring to the drawings, which are provided by way of example, and not by way of limitation, the present invention provides for an enclosure 10, such as a lavatory for a cabin 12 of an aircraft (not shown), although the enclosure may also be an aircraft closet, or an aircraft galley, or similar enclosed or structurally defined spaces, for example. As is illustrated in FIG. 2, the cabin includes a structure 14, and the enclosure may be taller than the cabin structure. The cabin structure can be a passenger seat 16, for example, installed immediately forward of the enclosure and having an aft portion 18 with and exterior aft surface 20 that is substantially not flat in a vertical plane 22. The lavatory includes a lavatory stall unit 24 having one or more walls 26 having a forward wall portion 28. The one or more walls define an interior lavatory space 30, and the forward wall portion is configured to be disposed immediately aft of and adjacent to or abutting the exterior aft surface of the aircraft cabin structure. The forward wall portion has a shape that is substantially not flat in the vertical plane, and preferably is shaped to include a recess 34 such that the forward wall portion substantially conforms to the shape of the exterior aft surface of the aircraft cabin structure. In a presently preferred aspect, the forward wall portion of the lavatory stall unit is configured to accept loads from the passenger seat. As shown in FIG. 2, the forward wall portion 28 can be configured to provide a lower recess 100 formed between the forward wall portion 28 and the cabin deck 102. As also shown in FIG. 2, the lower recess 100 can be configured to receive at least a portion of an aft-extending seat support 17 therein. As can be seen by comparing FIG. 1 and FIG. 2, the recess 34 and the lower recess 100 combine to permit the passenger seat 16 to be positioned farther aft in the cabin than would be possible if the lavatory enclosure 10 included a conventional flat and vertical forward wall without recesses like that shown in FIG. 1, or included a forward wall that did not include both recesses 34, 100.

In another presently preferred aspect, the forward wall portion defines a secondary space 36 in the interior lavatory space in an area 38 forward of an aft-most portion 40 of the forward wall portion, and the forward wall portion includes a forward projection 42 configured to project over the aft portion of the adjacent passenger seat back 44 immediately forward of the lavatory stall unit. The secondary space can include an amenity stowage space 46 inside the lavatory stall unit in the area forward of the aft-most portion of the forward wall portion, and the secondary space can include design elements providing visual space, such as a visual perception of space, inside the lavatory in the area forward of an aft-most portion of the forward wall portion.

It will be apparent from the foregoing that while particular forms of the invention have been illustrated and described, various modifications can be made without departing from the spirit and scope of the invention. Accordingly, it is not intended that the invention be limited, except as by the appended claims.

The invention claimed is:

1. A method of retrofitting an aircraft to reduce a volume of unusable space in a cabin area of a passenger aircraft, said cabin area containing passenger seats each having a seat back with an exterior aft surface that is substantially not flat, a seat bottom, and a seat support that interfaces with a floor of the cabin area and holds the seat bottom in an elevated position above the floor of the cabin area, the method comprising:
 replacing at least a previously-installed forward wall of a pre-existing full height lavatory unit in the cabin area of the passenger aircraft with a contoured forward wall, wherein
 an outward facing vertical surface of the previously-installed forward wall is substantially flat, and
 the contoured forward wall is substantially not flat and configured to receive a portion of the exterior aft surface of the seat back when the seat back is in an unreclined seat position; and
 installing a passenger seat in front of the contoured forward wall, wherein installing comprises positioning a seat support further aft in said aircraft cabin than the seat support could have been positioned prior to replacing the previously-installed forward wall;
 wherein, upon installation, a portion of the exterior aft surface of the seat back is received by the forward wall when the passenger seat is in an upright seating position.

2. The method of claim 1, wherein the contoured forward wall is further configured to receive an aft-extending portion of the seat support at a position previously occupied by the previously-installed forward wall.

3. The method of claim 2, wherein the contoured forward wall comprises an aft-extending recess extending along substantially a full width of the contoured forward wall, wherein the aft-extending recess is configured to receive the portion of the seat support.

4. The method of claim 1, wherein the passenger seat is installed immediately forward of the contoured forward wall, the contoured forward wall being configured, upon installation, to accept loads from the passenger seat.

5. The method of claim 1, wherein the contoured forward wall comprises an aft-extending recess extending along substantially a full width of the contoured forward wall, wherein the aft-extending recess is configured to receive the portion of the exterior aft surface of the seat back.

6. The method of claim 1, wherein the contoured forward wall further comprises an upper projection that, upon installation, protrudes forward over a top of the seat back when the passenger seat is in an unreclined position.

7. The method of claim 6, wherein the upper projection is configured to abut an upper surface of the cabin area.

8. The method of claim 6, wherein the upper projection defines an interior storage space in the aircraft lavatory.

9. The method of claim 8, wherein the interior storage space includes one or more secondary storage spaces.

10. The method of claim 1, wherein said passenger seat has a contoured shape including a first section extending along a first axis and a second section extending along a second axis, said first section adapted to support a passenger's head and a second adapted to support a passenger's back, wherein said first axis is not parallel with said second axis.

11. The method of claim 1, wherein a combined weight of the contoured forward wall and passenger seat is reduced in comparison to a combined weight of the previously installed forward wall and the passenger seat.

12. The method of claim 1, wherein the portion of the exterior aft surface of the seat back received by the forward wall is substantially more than a headrest portion of the exterior aft surface of the seat back.

13. The method of claim 1, wherein the portion of the exterior aft surface of the seat back received by the forward wall is more than an upper half of the exterior aft surface of the seat back.

14. An aircraft lavatory enclosure for installing in a cabin area of a passenger aircraft, the aircraft lavatory enclosure comprising:
 an aft partition; and
 a contoured forward partition having
  means for providing space for a head rest of a fore positioned passenger seat, and
  means for providing space for a seat back of the fore positioned passenger seat,
  wherein the means for providing space for the head rest and the means for providing space for the seat back cooperate to provide additional space forward of the aircraft lavatory enclosure for the fore positioned passenger seat to be positioned further aft in the cabin when compared with a position of the passenger seat if the forward partition was instead substantially flat;
 wherein the aft partition and the contoured forward partition define a full-height lavatory space disposed therebetween; and
 wherein the fore positioned passenger seat comprises a seat support having a plurality of seat legs, and the contoured forward partition further comprises means for receiving at least a portion of the seat support.

15. The aircraft lavatory enclosure of claim 14, wherein:
 the means for providing space for the head rest is immediately adjacent but not abutting the head rest of the fore positioned passenger seat while the fore passenger seat is in an upright position; and
 the means for providing space for the seat back is immediately adjacent but not abutting the seat back of the fore positioned passenger seat while the passenger seat is in the upright position.

16. The aircraft lavatory enclosure of claim 14, wherein the passenger seat is installed immediately forward of the contoured forward partition, the contoured forward partition being configured, upon installation, to accept loads from the fore positioned passenger seat.

17. The aircraft lavatory enclosure of claim 14, wherein the means for providing space for the seat back extends along substantially a full width of the contoured forward partition.

18. The aircraft lavatory enclosure of claim 14, wherein the contoured forward partition further comprises an upper projection that, upon installation, protrudes forward over a top of the seat back.

19. The aircraft lavatory enclosure of claim 18, wherein the upper projection defines an interior storage space in the aircraft lavatory.

\* \* \* \* \*